Patented July 29, 1947

2,424,885

UNITED STATES PATENT OFFICE 2,424,885

PARAFORMALDEHYDE TREATMENT OF REACTION PRODUCTS OF DIISOCYANATE WITH LINEAR POLYESTERS AND LINEAR POLYESTER-AMIDES AND PRODUCTS RESULTING THEREFROM

Jack Mitchell Buist, David Augustine Harper, Walter Fairbairn Smith, and George Neale Welding, Blackley, Manchester, England, assignors to Imperial Chemical Industries Limited, a corporation of Great Britain No Drawing. Application February 17, 1944, Serial No. 522,801. In Great Britain December 21, 1942

8 Claims. (Cl. 260—72)

This invention relates to improvements in the curing of polymeric materials more especially in the curing of organic diisocyanate modified polyesters or polyesteramides.

It has already been proposed to manufacture polymeric materials by heating together polyester-forming ingredients in the presence or absence of polyamide-forming ingredients. For instance, such polymeric materials are obtained by heating a glycol and/or an aminoalcohol with a dibasic carboxylic acid, optionally in the presence of one or more additional ingredients, namely, a diamine, an aminocarboxylic acid or a hydroxycarboxylic acid; alternatively, one or more of the ingredients may be used in the form of the corresponding ester- or amide-forming derivatives. In order to obtain linear polymers, the amounts of the various ingredients are selected so that there are present approximately chemically equivalent proportions of their complementary ester-forming groups and also of their complementary amide-forming groups, if amide-forming ingredients are used. The linear polyesters or the linear polyester-amides which may be obtained in this way or usually soft, waxy materials with a relatively low molecular weight.

It has been proposed to convert these soft, waxy, low molecular weight, linear polymers into tough polymers of considerably higher molecular weight by heating them with small proportions of an organic diisocyanate such as hexamethylene diisocyanate. Furthermore, it has been proposed so to treat such low molecular weight, linear polymers which have been obtained by reacting the several ingredients in such proportions that there is present in the reaction mixture a small excess of an alcoholic hydroxyl-containing ingredient over and above that theoretically required. If just sufficient of the diisocyanate to react with the end groups in the low molecular weight, linear polymers is used in their conversion into the high molecular weight polymers, there are obtained linear polymers which can be extruded into cold-drawable filaments. However, if greater proportions of the diisocyanate are used, there are obtained tough, rubbery, partly cross-linked, high molecular weight polymers which cannot be extruded into cold-drawable filaments. Whatever proportions of the diisocyanate are reacted with the linear polyesters or polyesteramides, we shall refer to the resulting polymers collectively as organic diisocyanate modified polyesters or polyester-amides, and it is with these modified polymers that the present invention is concerned.

Examples of organic diisocyanates that may be used as described above are ethylene diisocyanate, trimethylene diisocyanate, tetramethylene diisocyanate, hexamethylene diisocyanate, decamethylene diisocyanate, m-phenylene diisocyanate and naphthalene diisocyanates.

In British patent application No. 13,204, filed October 14, 1941 (U. S. Serial No. 466,356, filed November 20, 1942), it has been proposed to cure organic diisocyanate modified polyesters or polyester-amides by heating these in the presence of paraformaldehyde, and in the presence or absence of materials which function as curing catalysts, namely, acids, acid anhydrides or acid-reacting salts.

These curing catalysts cause an increase in the rate of interaction of the polymeric material and the paraformaldehyde, and enable curing to be effected at a lower temperature or more rapidly than would otherwise be possible. Frequently, however, the activities of these catalysts are such that, when they are incorporated with the polymeric materials and the paraformaldehyde in the usual manner on a rubber mill the heat produced by the action of the milling, is sufficient to cause premature curing or, as it is more usually called, scorching of the mix.

As a means of obviating scorching of such mixes it has been proposed in British patent application No. 7,392, filed June 1, 1942 (U. S. Serial No. 488,444, filed May 25, 1943), to use, as curing catalysts, materials which are substantially neutral and remain so at temperatures attaining during milling or other pre-curing operation, but which develop acidity at temperatures attained during curing, that is, at temperatures of about 100–150° C.

However, when materials which develop acidity under curing conditions are used as curing catalysts and even when no curing catalysts are used, there is some tendency for scorching of the mix during milling or other pre-curing operations. The present invention is directed to a means for avoiding this tendency, and is based on the discovery that the risk of scorching is reduced or entirely removed by incorporating into the mix a small proportion of an acid-accepting material.

Further, it has been found that when small proportions of acid-accepting materials are included in the mix and the mix is cured by heat, cured materials with good physical properties are obtained.

According to the invention, in the process of compounding organic diisocyanate modified polyesters or polyester-amides in the presence of paraformaldehyde, and in the presence or absence of a curing catalyst of the kind hereinbefore described, we provide the improvement which comprises effecting the compounding also in the presence of a small proportion of an acid-accepting material.

As curing catalysts there may be used, for example, organic acids such as formic, glycollic, oxalic, succinic, maleic, adipic, tartaric, salicyclic, anthranilic, phthalic, citric and tannic acids; inorganic acids such as boric and phosphoric acids; acid anhydrides such as phthalic or maleic anhydrides or functional derivatives of these, for example, phthalimide; acid-reacting salts such as potassium or sodium dihydrogen phosphate; materials which are substantially neutral but which develop acidity under curing conditions such as butadiene sulphone, 2:3-dimethylbutadiene sulphone, butadiene tetrabromide, styrene dibromide, acetylene tetrabromide, tribromohydroquinone, 1-bromo-2-naphthol, 1:6-dibromo-2-naphthol, 1:4:6-tribromo-2-naphthol, 2:4-dibromo-1-naphthol, methyl $\alpha:\beta$-dibromo-propionate, $\beta$-chloroethyl $\alpha:\beta$-dibromoisobutyrate, ethyl $\alpha$-bromo-propionate, phenyl trichloroacetate, $\alpha:\alpha:\beta$-trichloropropionitrile, trichloroacetamide, trichloroacetyldiethylamide, N-trichloroacetylanilide, N:N'-di-(trichloroacetyl)methylenediamine, N:N'-di-(trichloracetyl)ethylenediamine, interpolymers of asymmetrical dichloroethylene and vinyl chloride, and chloranil (tetrachloro-p-benzoquinone).

As acid-accepting materials there may be used, any materials which react as bases under the conditions obtaining during compounding and which will, therefore, neutralise any acid which may otherwise be present or which may be formed in the mixes during compounding for example, monoethanolamine, diethanolamine, triethanolamine, sodium acetate, sodium oleate, iron oxide, zinc oxide, magnesium oxide, litharge, zinc stearate, zinc diethyl dithiocarbamate and diphenylguanidine. The incorporation of large proportions of acid-accepting materials in the mixes inhibits curing entirely or almost entirely. Accordingly, the proportions of acid-accepting materials used for the purposes of the present invention, whilst being sufficiently large as to obviate scorching, must not be so large as to appreciably inhibit curing. The proportions required vary with particle size, degree of dispersion, conditions of mixing and the chemical nature of the materials being used, and are determined by trial.

As well as the ingredients already mentioned one or more additional ingredients may also be used. These include non-basic fillers, for example carbon black, clay, asbestos, blanc fixe and mica; other plastic materials, for example, natural or synthetic rubbers, vulcanised vegetable oils, dark substitute, white substitute, coumar gum, wood rosin and pitch; detackifying agents, for example stearic acid, paraffin wax, oleic acid and lauric acid; plasticizers, for example, tricresyl phosphate, dibutyl phthalate, butylphthalyl butyl glycollate and N-alkyltoluene-sulphonamides; stabilisers or anti-oxidants, for example, hydroquinone N:N'-hexamethylene-bis-o-hydroxybenzamide, N-phenyl-$\alpha$-naphthylamine, N-phenyl-$\beta$-naphthylamine and $\alpha:\alpha$-bis(2-hydroxy-3:5-dimethylphenyl)butane. Small quantities of non-basic pigments, for example from 1–3% by weight, such as are customarily used in rubber technology, may also be used to impart colour. As polyester- and polyester-amide forming reactants suitable for making the soft, waxy, low molecular weight, linear polymers there may be used glycols, for example, ethylene glycol, diethylene glycol, triethylene glycol, trimethylene glycol, pentamethylene glycol, hexamethylene glycol, decamethylene glycol, dodecamethylene glycol, 1:12-octadecanediol, and pentaglycol; aliphatic or aromatic aminoalcohols preferably having two hydrogen atoms attached to the amino nitrogen atom and preferably containing a saturated aliphatic chain of at least two carbon atoms separating the amino and hydroxyl groups, for example, mono-ethanolamine and 3-aminopropanol; dibasic carboxylic acids or ester-forming derivatives thereof, preferably saturated or unsaturated aliphatic dicarboxylic acids for example, malonic succinic, glutaric, suberic, azelaic, $\beta$-methyl-adipic, adipic, pimelic, undecanedioic, brassylic, isophthalic, hexahydroterephthalic, p-phenylene, diacetic, dihyromuconic, and acetone-dicarboxylic acids; diamines such as ethylenediamine, hexamethylenediamine, 3-methylhexamethylenediamine, decamethylene diamine and m-phenylenediamine; monohydroxymonocarboxylic acids or their ester-forming derivatives, for example, glycollic, 6-hydroxycaproic, 10-hydroxydecanoic and 12-hydroxystearic acids; polymerizable monoaminomonocarboxylic acids or their amide-forming derivatives, for example, 6-aminocaproic acid or its amide-forming derivative caprolactam, 9-aminononanoic, 11-aminoundecanoic and 12-aminostearic acids.

The low molecular weight linear polymers are made by heating the selected ingredients at polymerizing temperatures, usually in the absence of air or oxygen under conditions whereby water is removed from the reaction mixture. When using a diamine as one of the ingredients, it is convenient to use it as the corresponding diammonium salt formed from some of the dibasic carboxylic acid to be used.

The low molecular weight linear polymers are converted into the high molecular weight polymers by mixing them, for example, by stirring, milling or kneading, with the organic diisocyanate and heating the mixture, for example, to a temperature of 120°–200° C., for a period of about 10–120 minutes. Up to about 10 per cent and usually between 3 and 7 per cent of the diisocyanate is used. The polymers modified with diisocyanates may be polyesters having no recurring intralinear carbonamide groups or they may be polyester-amides having a ratio of intralinear ester to carbonamide groups of 1:1, as in the case of polyesters made from dibasic acid and ethanolamine or having a higher ratio of ester to amide groups.

The paraformaldehyde used in the treatment of the diisocyanate modified polymers may be present in the ratio of 2.5 to 15 parts of paraformaldehyde per 100 parts of diisocyanate modified polymer.

In carrying the invention into practical effect the several ingredients are compounded together, conveniently on a rubber mill, at a temperature usually below about 70–90° C. If a material which develops acidity under curing conditions is used as a curing catalyst, preferably part or all of this material is added to the mix after the other ingredients are thoroughly dispersed therein. If an acid or acid-reacting material is used as a curing catalyst, all of this is added to the mix after the other ingredients are thoroughly dispersed therein. In other words, the order of adding the ingredients to the mix is so arranged that the beneficial effect of the acid-accepting material is preserved for as long as is conveniently possible.

It is advantageous, prior to adding the paraformaldehyde and the acid-accepting material to the mix, to mix these materials thoroughly with each other, for example, by forming a paste from the paraformaldehyde, the acid-accepting material and a plasticizer such as dibutyl phthalate and/or a dispersing agent such as sodium oleo-p-anisidine - 2 - sulphonate. When using such a paste there is an even lower tendency to scorch.

Whilst the invention is primarily concerned with mixes which are to be compounded by a mechanical operation as by milling whereby sufficient heat to cause scorching may be developed, it is not restricted to such methods of compounding. The ingredients may be incorporated with each other by using solutions. Alternatively, the ingredients may also be compounded together, in the presence of a solvent or swelling agent for the polymeric material, i. e., in the form of a dough.

The tendency of the mixes to scorch is conveniently determined by means of a Williams Plastometer modified in such a way that the percentage recovery after compression is measured (cf. Journal of Industrial and Engineering Chemistry, (1929), 21, 770). The use of this instrument involves heating samples of the mixes in the form of cylinders at a temperature below the usual curing temperature and measuring, at convenient intervals of time, the percentage recovery from the deformation produced by a standard compressive force. For a mix which remains unscorched low percentage recovery figures are recorded, whilst as scorching progresses, higher and higher percentage recovery figures are recorded. By conducting the tests at temperatures approximating to those obtaining in precuring operations comparative measurements can be made of the tendencies of mixes to undergo scorching during such operations. We have found that a good indication of the tendencies of mixes to scorch is obtained by conducting tests at 100° C.

The mixes obtained may be cured in accordance with conventional practice. The temperature and time of curing vary with the nature of the ingredients in the mix. Usually heating at about 100–150° C. for periods of time varying from a few minutes to several hours according to the temperature is suitable. The mix may be formed into shapes or spread or calendered on to a substrate, for example, on to the surface of a fabric, and cured by heating in a press or mould or in hot air.

The invention is illustrated but not limited by the following examples in which the parts are expressed by weight.

Example 1

Mixes of the following components are made up on a two-roll rubber mill:

|  | A | B |
|---|---|---|
| Diisocyanate modified polyester-amide | 100 | 100 |
| Hydroquinone | 2 | 2 |
| Carbon black | 60 | 60 |
| Paraformaldehyde | 8 | 8 |
| Monoethanolamine | 0.5 | |

The data in the following table, which represent measurements made in the recovery plastometer on sample cylinders cut from each of the above mixes show the lower scorching tendency of the mix containing the monoethanolamine:

| Time of heating at 100° C. in minutes | Percentage recovery | |
|---|---|---|
|  | A | B |
| 0 | 51 | 54 |
| 20 |  | 80 |
| 40 | 60 |  |
| 80 | 68 |  |

The two mixes are compounded with a curing catalyst, namely, 1.5 parts of an interpolymer of asymmetrical dichloroethylene and vinyl chloride, and cured in a mould under hydraulic pressure at a temperature of 141° C. for 15 minutes. Some of the properties of the cured materials are as follows:

|  | A | B |
|---|---|---|
| Tensile strength, Kg./cm.$^2$ | 193 | 193 |
| Elongation at break, percent | 477 | 393 |
| Modulus at 300% extension | 108 | 146 |
| Resilience at 50° C | 63.8 | 70.5 |
| B. S. I. hardness | 58 | 56 |

Example 2

Mixes of the following components are made up on a two-roll rubber mill:

|  | A | B |
|---|---|---|
| Diisocyanate modified polyester-amide | 100 | 100 |
| Hydroquinone | 2 | 2 |
| Carbon black | 60 | 60 |
| Paraformaldehyde | 5 | 5 |
| Stearic acid | 0.5 | 0.5 |
| Sodium oleate | 0.75 |  |

The data in the following table, which represent measurements made in the recovery plastometer on sample cylinders cut from each of the above mixes, show the lower scorching tendency of the mix containing sodium oleate:

| Time of heating at 100° C. in minutes | Percentage recovery | |
|---|---|---|
|  | A | B |
| 0 | 3 | 5 |
| 5 | 5 | 2 |
| 10 | 7 | 8 |
| 15 | 4 | 12 |
| 20 | 3 | 12 |
| 30 | 14 | 50 |
| 40 | 20 |  |

The two mixes are compounded with a curing catalyst, namely, 1.5 parts of 1-bromo-2-naphthol, and cured in a mould under hydraulic pressure at a temperature of 125° C. for 30 minutes.

Some of the properties of the cured materials are as follows:

|  | A | B |
|---|---|---|
| Tensile strength, Kg./cm.$^2$ | 150 | 140 |
| Elongation at break, per cent | 613 | 500 |
| Modulus at 200% extension | 30 | 42 |
| Resilience at 50° C | 53.8 | 63 |
| B. S. I. hardness | 75 | 48.0 |

Sodium oleate also reduces the tendency to scorch of mixes containing 10 parts of dimethylolurea or 10 parts of dimethoxymethyluron in place of the paraformaldehyde.

Example 3

Mixes of the following components are made up on a two-roll rubber mill, the paste used in mix A being made by ball-milling for several hours 5 parts of paraformaldehyde, 2.5 parts of dibutyl phthalate and 0.75 part of monoethanolamine:

|  | A | B |
|---|---|---|
| Diisocyanate modified polyester-amide | 100 | 100 |
| Hydroquinone | 2 | 2 |
| Carbon black | 60 | 60 |
| Paste | 8.25 |  |
| Paraformaldehyde |  | 5 |

The data in the following table, which represent measurements made in the recovery plastometer on sample cylinders cut from each of the above mixes, show the lower scorching tendency of the mix containing monoethanolamine:

| Time of heating at 100° C. in minutes | Percentage Recovery | |
|---|---|---|
|  | A | B |
| 0 | 5 | 5 |
| 10 |  | 30 |
| 15 |  | 56 |
| 20 |  | 58 |
| 30 | 6 |  |
| 45 | 8 |  |
| 60 | 8 |  |
| 90 | 18 |  |
| 120 | 15 |  |
|  | 14 |  |

The two mixes are compounded with 1.5 parts of 1-bromo-2-naphthol and the recovery plastometer measurements given in the following table again show the lower tendency to scorch of the mix containing the monoethanolamine:

| Time of heating at 100° C. in minutes | Percentage Recovery | |
|---|---|---|
|  | A | B |
| 0 | 5 | 30 |
| 10 |  | 44 |
| 20 | 15 | 78 |
| 25 | 54 |  |

The mixes are cured in a mould under hydraulic pressure at a temperature of 125° C. for 45 minutes. Some of the properties of the cured materials are as follows:

|  | A | B |
|---|---|---|
| Tensile strength, Kg./cm.$^2$ | 172 | 132 |
| Elongation at break, per cent | 575 | 446 |
| Modulus at 200% extension | 38 | 50 |
| Resilience at 50° C | 55.4 | 59.4 |
| B. S. I. hardness | 62 | 66 |

Example 4

Mixes of the following components are made up on a two-roll rubber mill, the paste used in mixes C and D being made by ball-milling for several hours 5 parts of paraformaldehyde, 2.5 parts of dibutylphthalate and 0.25 parts of monoethanolamine:

|  | A | B | C | D |
|---|---|---|---|---|
| Diisocyanate modified polyester-amide | 100 | 100 | 100 | 100 |
| Hydroquinone | 2 | 2 | 2 | 2 |
| Stearic acid | 0.5 | 0.5 | 0.5 | 0.5 |
| Carbon black | 60 | 60 | 60 | 60 |
| Paraformaldehyde | 5 | 5 |  |  |
| Dibutyl phthalate |  | 2.5 |  |  |
| Monoethanolamine |  | 0.25 |  |  |
| Paste |  |  | 7.75 |  |
| Paste after storing for 8 days |  |  |  | 7.75 |
| 1-Bromo-2-naphthol | 1.5 | 1.5 | 1.5 | 1.5 |

The data in the following table, which represent measurements made in the recovery plastometer in sample cylinders cut from each of the mixes, show their relative scorching tendencies:

| Time of heating at 100° C. in minutes | Percentage Recovery | | | |
|---|---|---|---|---|
|  | A | B | C | D |
| 0 |  |  |  |  |
| 10 | 30 | 20 | 15 | 9 |
| 15 | 44 | 29 | 26 |  |
| 20 |  | 39 | 27 |  |
| 25 | 78 | 64 | 44 | 25 |
| 30 |  |  |  | 34 |
| 40 |  |  | 83 | 49 |

The mixes are cured in a mould under hydraulic pressure at 125° C. for 45 minutes. Some of the properties of the cured materials are as follows:

|  | A | B | C | D |
|---|---|---|---|---|
| Tensile strength, Kg./cm.$^2$ | 132 | 206 | 176 | 157 |
| Elongation at break, per cent | 448 | 667 | 546 | 513 |
| Modulus at 200% extension | 50 | 32 | 42 | 40 |
| Resilience at 50° C | 59.1 | 46.0 | 55.1 | 58.7 |
| B. S. I. hardness | 66 | 87 | 67 | 57 |

The diisocyanate modified polyester-amide used in the above examples is that described in Example 7 of British patent application No. 13,204, filed October 14, 1941, and is obtained as follows:

127.75 parts of adipic acid, 42.25 parts of ethylene glycol and 13.6 parts of monoethanolamine are heated together under carbon dioxide to 190° C. during seventeen hours and the mixture is then subjected to continuous azeotropic distillation with xylene at 180–190° C. for twenty-two hours. Most of the xylene is then removed by distillation at 185° C. A pale yellow syrup with a melt viscosity of 68 poises at 75° C. and an acid value of 9.6 mgm. KOH per gm. is obtained. This syrup slowly hardens to a soft, cream-colored wax.

This wax is treated in a steam heated internal mixer at 145° C. with 4–5% of hexamethylene diisocyanate (added in three portions at fifteen minute intervals). The so obtained diisocyanate modified polyester-amide is a soft, rubber-like material which does not harden on standing.

We claim:

1. In the process of compounding a diisocyanate modified polymer with 2.5 to 15 parts of paraformaldehyde per 100 parts of the modified polymer, said diisocyanate modified polymer being the reaction product of a low molecular weight linear polymer and from 3% to 10% of said polymer of a hydrocarbon diisocyanate and said polymer being of the class consisting of polyesters containing recurring intralinear carboxylic ester groups and polyester-amides containing recurring intralinear carboxylic ester groups and recurring intralinear carbonamide groups, the ratio of said ester groups to said carbonamide groups being at least 1:1, the step which comprises effecting the compounding in the presence of 0.25 to 0.75 part per 100 parts of the diisocyanate modified polymer, of a basic material which will neutralize acid present during compounding.

2. The process of claim 1 characterized in that the paraformaldehyde and the basic material are thoroughly mixed with each other before being mixed with the diisocyanate-polymer reaction product.

3. The process of claim 1 characterized in that the paraformaldehyde and the basic material are thoroughly mixed with each other in the form of a paste before being mixed with the diisocyanate-polymer reaction product.

4. In the process of compounding a diisocyanate modified polymer with 2.5 to 15 parts of paraformaldehyde per 100 parts of the modified polymer, said diisocyanate modified polymer being the reaction product of a low molecular weight linear polymer and from 3% to 10% of said polymer of a hydrocarbon diisocyanate and said polymer being of the class consisting of polyesters containing recurring intralinear carboxylic ester groups and polyester-amides containing recurring intralinear carboxylic ester groups and recurring intralinear carbonamide groups, the ratio of said ester groups to said carbonamide groups being at least 1:1, the step which comprises effecting the compounding in the presence of an acidic curing agent and of 0.25 to 0.75 part per 100 parts of the diisocyanate modified polymer, of a basic material which will neutralize acid present during compounding.

5. The process of claim 1 characterized in that, subsequent to compounding, the mass is subjected to a temperature of 100–150° C. whereby to effect curing.

6. A product comprising a diisocyanate modified polymer, 2.5 to 15 parts of paraformaldehyde per 100 parts of the modified polymer and 0.25 to 0.75 part per 100 parts of the modified polymer, of a basic material which will neutralize acid present, said diisocyanate modified polymer being the reaction product of a low molecular weight linear polymer and from 3% to 10% of said polymer of a hydrocarbon diisocyanate and said polymer being of the class consisting of polyesters containing recurring intralinear carboxylic ester groups and polyester-amides containing recurring intralinear carboxylic ester groups and recurring intralinear carbonamide groups, the ratio of said ester groups to said carbonamide groups being at least 1:1.

7. A product comprising a diisocyanate modified polymer, 2.5 to 15 parts of paraformaldehyde per 100 parts of the modified polymer, an acidic curing agent and 0.25 to 0.75 parts per 100 parts of the modified polymer, of a basic material which will neutralize acid present, said diisocyanate modified polymer being the reaction product of a low molecular weight linear polymer and from 3% to 10% of said polymer of a hydrocarbon diisocyanate and said polymer being of the class consisting of polyesters containing recurring intralinear carboxylic ester groups and polyester-amides containing recurring intralinear carboxylic ester groups and recurring intralinear carbonamide groups, the ratio of said ester groups to said carbonamide groups being at least 1:1.

8. The heat cured product of claim 6.

JACK MITCHELL BUIST.
DAVID AUGUSTINE HARPER.
WALTER FAIRBAIRN SMITH.
GEORGE NEALE WELDING.

REFERENCES CITED

The following references are of record in the file of this patent:

UNITED STATES PATENTS

| Number | Name | Date |
|---|---|---|
| 2,333,917 | Christ et al. | Nov. 9, 1943 |

Certificate of Correction

Patent No. 2,424,885.  July 29, 1947.

JACK MITCHELL BUIST ET AL.

It is hereby certified that error appears in the printed specification of the above numbered patent requiring correction as follows: Column 1, line 25, for "way or" read *way are*; and that the said Letters Patent should be read with this correction therein that the same may conform to the record of the case in the Patent Office.

Signed and sealed this 2nd day of September, A. D. 1947.

[SEAL]

LESLIE FRAZER,
*First Assistant Commissioner of Patents.* a hydrocarbon diisocyanate and said polymer being of the class consisting of polyesters containing recurring intralinear carboxylic ester groups and polyester-amides containing recurring intralinear carboxylic ester groups and recurring intralinear carbonamide groups, the ratio of said ester groups to said carbonamide groups being at least 1:1, the step which comprises effecting the compounding in the presence of 0.25 to 0.75 part per 100 parts of the diisocyanate modified polymer, of a basic material which will neutralize acid present during compounding.

2. The process of claim 1 characterized in that the paraformaldehyde and the basic material are thoroughly mixed with each other before being mixed with the diisocyanate-polymer reaction product.

3. The process of claim 1 characterized in that the paraformaldehyde and the basic material are thoroughly mixed with each other in the form of a paste before being mixed with the diisocyanate-polymer reaction product.

4. In the process of compounding a diisocyanate modified polymer with 2.5 to 15 parts of paraformaldehyde per 100 parts of the modified polymer, said diisocyanate modified polymer being the reaction product of a low molecular weight linear polymer and from 3% to 10% of said polymer of a hydrocarbon diisocyanate and said polymer being of the class consisting of polyesters containing recurring intralinear carboxylic ester groups and polyester-amides containing recurring intralinear carboxylic ester groups and recurring intralinear carbonamide groups, the ratio of said ester groups to said carbonamide groups being at least 1:1, the step which comprises effecting the compounding in the presence of an acidic curing agent and of 0.25 to 0.75 part per 100 parts of the diisocyanate modified polymer, of a basic material which will neutralize acid present during compounding.

5. The process of claim 1 characterized in that, subsequent to compounding, the mass is subjected to a temperature of 100–150° C. whereby to effect curing.

6. A product comprising a diisocyanate modified polymer, 2.5 to 15 parts of paraformaldehyde per 100 parts of the modified polymer and 0.25 to 0.75 part per 100 parts of the modified polymer, of a basic material which will neutralize acid present, said diisocyanate modified polymer being the reaction product of a low molecular weight linear polymer and from 3% to 10% of said polymer of a hydrocarbon diisocyanate and said polymer being of the class consisting of polyesters containing recurring intralinear carboxylic ester groups and polyester-amides containing recurring intralinear carboxylic ester groups and recurring intralinear carbonamide groups, the ratio of said ester groups to said carbonamide groups being at least 1:1.

7. A product comprising a diisocyanate modified polymer, 2.5 to 15 parts of paraformaldehyde per 100 parts of the modified polymer, an acidic curing agent and 0.25 to 0.75 parts per 100 parts of the modified polymer, of a basic material which will neutralize acid present, said diisocyanate modified polymer being the reaction product of a low molecular weight linear polymer and from 3% to 10% of said polymer of a hydrocarbon diisocyanate and said polymer being of the class consisting of polyesters containing recurring intralinear carboxylic ester groups and polyester-amides containing recurring intralinear carboxylic ester groups and recurring intralinear carbonamide groups, the ratio of said ester groups to said carbonamide groups being at least 1:1.

8. The heat cured product of claim 6.

JACK MITCHELL BUIST.
DAVID AUGUSTINE HARPER.
WALTER FAIRBAIRN SMITH.
GEORGE NEALE WELDING.

REFERENCES CITED

The following references are of record in the file of this patent:

UNITED STATES PATENTS

| Number | Name | Date |
| --- | --- | --- |
| 2,333,917 | Christ et al. | Nov. 9, 1943 |

---

Certificate of Correction

Patent No. 2,424,885. July 29, 1947.

JACK MITCHELL BUIST ET AL.

It is hereby certified that error appears in the printed specification of the above numbered patent requiring correction as follows: Column 1, line 25, for "way or" read *way are*; and that the said Letters Patent should be read with this correction therein that the same may conform to the record of the case in the Patent Office.

Signed and sealed this 2nd day of September, A. D. 1947.

[SEAL]

LESLIE FRAZER,
*First Assistant Commissioner of Patents.*